United States Patent [19]
Robertson

[11] Patent Number: 5,855,969
[45] Date of Patent: Jan. 5, 1999

[54] CO₂ LASER MARKING OF COATED SURFACES FOR PRODUCT IDENTIFICATION

[75] Inventor: John A. Robertson, Chillicothe, Ohio

[73] Assignee: Infosight Corp., Chillicothe, Ohio

[21] Appl. No.: 661,063

[22] Filed: Jun. 10, 1996

[51] Int. Cl.⁶ .................................. B05D 3/06; B05D 3/02
[52] U.S. Cl. ........................... 427/555; 427/387; 427/556
[58] Field of Search ..................... 427/554, 555, 427/556, 510, 511, 515, 387, 514

[56] References Cited

U.S. PATENT DOCUMENTS

| | | | |
|---|---|---|---|
| 4,515,867 | 5/1985 | Bleacher et al. | 427/555 |
| 4,572,886 | 2/1986 | Reid | 427/555 |
| 4,578,329 | 3/1986 | Holsappel | 427/555 |
| 4,595,647 | 6/1986 | Spanjer | 427/555 |
| 4,602,236 | 7/1986 | Borror et al. | 427/555 |
| 4,791,267 | 12/1988 | Yokoyama et al. | 427/515 |
| 5,397,686 | 3/1995 | Dominick et al. | 427/555 |
| 5,409,742 | 4/1995 | Arfsten et al. | 427/555 |

*Primary Examiner*—Marianne Padgett
*Attorney, Agent, or Firm*—Mueller and Smith, L.P.A.

[57] ABSTRACT

One aspect of the present invention is a method for marking metal or other product for its identification. This method includes the steps of: (a) forming on said product or on a tag to be attached to said product a layer of coating containing an additive that is darkenable under the action of a CO₂ laser beam to form product identification indicia; (b) providing a raster-scanning infrared laser beam emitting CO₂ laser that raster-scans in the Y-axis; (c) effecting impingement of said laser beam from said laser onto said coating layer, wherein one or more of said laser beam or said coating layer moves in the X-axis for said laser beam to form said product identification indicia from said additive that is darkened by said laser beam; and (d) if said coating layer was applied to a tag, attaching said tag to said product. The zone can be an area on the metal product that has been coated with a layer of the coating or can be a metal tag that has been coated with a layer of the coating. Another aspect of the present invention is the laser marked identification tag disclosed herein.

11 Claims, 3 Drawing Sheets

CO₂ LASER MARKING OF COATED SURFACES FOR PRODUCT IDENTIFICATION

BACKGROUND OF THE INVENTION

The present invention relates to the marking of metal for tracking and identification (e.g., information purposes, and more particularly to using laser marked coated metal zones therefor.

Primary metal mills require that their products be accurately identified. Molten metal batches have unique "heat" (batch) chemistries which affect the mechanical properties of the ultimate (further formed) end products. Tracking the many individual pieces produced from a heat is a difficult, time consuming process with many opportunities for error in the stressful (hot, noisy, dimly lit, and physically dangerous) mill environment.

Metals first exit the molten heat as very hot (e.g., 1,800° F. or 982° C.) slabs or billets. Ideally, these slabs and billets should be identified with bar coded information immediately after they solidify and while they are still on the run out tables (before they can be mixed up). Automatic identification (e.g., bar codes) are preferred because they help eliminate the errors inherent in manual marking and reading (estimated by some to be as high as 1 in 300 attempts).

High temperature tags (some with bar codes) have been used for some time. For example, one commercial tag product (supplied by Pannier Corp., Pittsburgh, Pa.) is a relatively thin (e.g. 0.008 in or 0.2032 mm thick) stainless steel tag coated with a high temperature white coating and are printable on-site using a dot matrix impact (inked ribbon) printer. These tags then are manually affixed to the slab or billet using a powder charged or pneumatically driven nail gun. Efforts to automate this prior art tag have generally not been successful because the dot matrix printer mechanism is "delicate" (dot matrix head and ribbon) and does not survive well in the vicinity of hot/dirty products; and the printer ribbon needs frequent replacement (e.g., every 300 tags), especially if high contrast bar codes are desired. Further, the nailing mechanism is difficult to automate as the environment is not conducive to bowl feeders. Nail "sticks" are limited to, say, 50 nails and stick feeds are unproved. Also, nailing becomes less acceptable (it is a foreign imperfection) and attachment is less reliable in premium (harder) grades of metal. Finally, nailing is increasingly unreliable as the product cools (hardens).

Another proposal is found in U.S. Pat. No. 5,422,167 which discloses a label that is formed from a sheet of metal having a face and a back. The sheet face is coated with a layer of coating that is resistant to temperature of the hot metal stock and receptive to being thermally transfer printed. The metal sheet label is of a thickness so that the coating layer can be thermally transfer printed using conventional markers designed for paper or films. The printed label is adapted to be attached to hot (1,200° F. or 648.8° C.) metal stock by welding bare (uncoated) zones of the label. This tag system can withstand the rigors of, for example, steel coil or "hot bands" production and can be attached by welding.

Further, Nierenberg (U.S. Pat. No. 4,323,755) vaporizes a pattern (bar code) on glass CRTs for their identification. To improve contrast, the vaporized area can be coated first. Williams (U.S. Pat. No. 5,206,280) discloses a laser markable white pigment composition. Shimokawa (U.S. Pat. No. 4,847,181) proposes a dual layer label that can be laser marked. Gnanamuthu (U.S. Pat. No. 4,716,270) proposes a laser marking system where substrate is etched following laser marking of a label. Norris (U.S. Pat. No. 5,262,613) retrofits a mechanical engraver with a laser. Snakenborg (U.S. Pat. No. 4,946,763) proposes form a pattern in a metal stencil which is covered by a resist material containing a high concentration of metal powder. Resist material is removed by a laser beam to form the pattern. Honaker (U.S. Pat. No. 4,935,288) proposes a laser printable label having a coating of laser printable acrylic. Kiyonari (U.S. Pat. No. 5,063,137) proposes a resin composition for laser marking having an inorganic compound, like an anhydrous metal borate salt, and a resin. Kiyonari (U.S. Pat. No. 5,035,983) proposes a laser marking composition containing a non-black inorganic lead compound. Azuma (U.S. Pat. No. 4,861,620) proposes a pigment layer which can be marked by a laser beam. Herren (U.S. Pat. No. 5,030,551) laser marks ceramic materials coated with a transparent layer of titanium dioxide. Gernier (U.S. Pat. No. 4,985,780) proposes a two carriage assembly for laser marking articles.

Still, there exists a need in the art for a tag and identification system that can withstand the rigors of primary metal mills and in which the tag production and affixation are automated in order to provide significant labor savings (e.g., at least 1 worker per shift) and to eliminate the errors resulting from manual application (e.g., shuffled tags, sequences out of step by one, etc.).

Additionally, a variety of other raw and finished goods (e.g., automobile mechanical parts, tires, etc.) require marking for identification or information purposes. Such goods may be at or below room temperature when the marking requirement arises. A system that has the flexibility to mark "hot" metal as well as lower temperature items would be welcome.

BROAD STATEMENT OF THE INVENTION

One aspect of the present invention is a method for marking metal or other product for its identification. For present purposes, "identification" includes information, decoration, and any other purpose for which an indicia is placed upon a product in its raw, partially prepared, or final state. This method includes the steps of: (a) forming on said product or on a tag to be attached to said product a layer of coating containing an additive that is darkenable under the action of a $CO_2$ laser beam to form product identification indicia; (b) providing a raster-scanning infrared laser beam emitting $CO_2$ laser that raster-scans in the Y-axis; (c) effecting impingement of said laser beam from said laser onto said coating layer, wherein one or more of said laser beam or said coating layer moves in the X-axis for said laser beam to form said product identification indicia from said additive that is darkened by said laser beam; and (e) if said coating layer was applied to a tag, attaching said tag to said product. The zone can be an area on the metal product that has been coated with a layer of the coating or can be a metal tag that has been coated with a layer of the coating.

Another aspect of the present invention is the laser marked identification tag disclosed herein. Such coated tag can be formed to have bare areas (e.g., edges) for resistance welding attachment. Alternatively, such a tag can be made thick (e.g., >0.025 in or 0.636 mm thick) for plasma or other welding where the tag itself would serve as the welding filler. Further, attachment of the tag at only one of its edges would facilitate its later removal by prying or "cracking" if off.

Advantages of the present invention include a identification system that can withstand the rigors of primary metal mills, yet is fully automated. Another advantage is an identification system that can provide both alphanumeric characters as well as graphics. A further advantage is the ability to attach the tags to the metal, plastic, ceramic, or other product without causing a foreign imperfection. Yet another advantage is the ability to "self-tag" the metal product by directly marking it. A yet further advantage is the ability to also use the inventive identification system on room and other temperature raw and finished goods. These and other advantages will be readily apparent to those skilled in the art based on the disclose contained herein.

The drawings will be described in detail below.

DETAILED DESCRIPTION OF THE INVENTION

Conventional marking systems have employed bidirectional laser scanning systems employing X-axis and Y-axis galvanometers so that the separate mirrors can scan both in the X and the Y axis. Such dual galvanometers systems and their associated "flat field" lenses are very expensive. The present invention, however, laser marks a coating employing but a one axis (Y-axis) marker ($CO_2$ laser) with bi-directional mirror scanning. The scanning angle can be reduced to coincide with the indicia being created; thus, skipping over blank areas to speed up the marking process. Next, either the optics of the laser scanning system or the layer of coating on a substrate or tag, can move along a single axis (X-axis). This relative movement creates an effective X-axis/Y-axis marking system with but a single mirror for the $CO_2$ laser. Moreover, the X-axis can fast step over zones which do not require marking; again, speeding up the marking process. Of course, the Y-axis scan and the X-axis stepping are in registry for creating the desired indicia on the coating being marked. Such indicia can be an alphanumeric character in any desired language, a graphic, or combinations.

Figure 1:
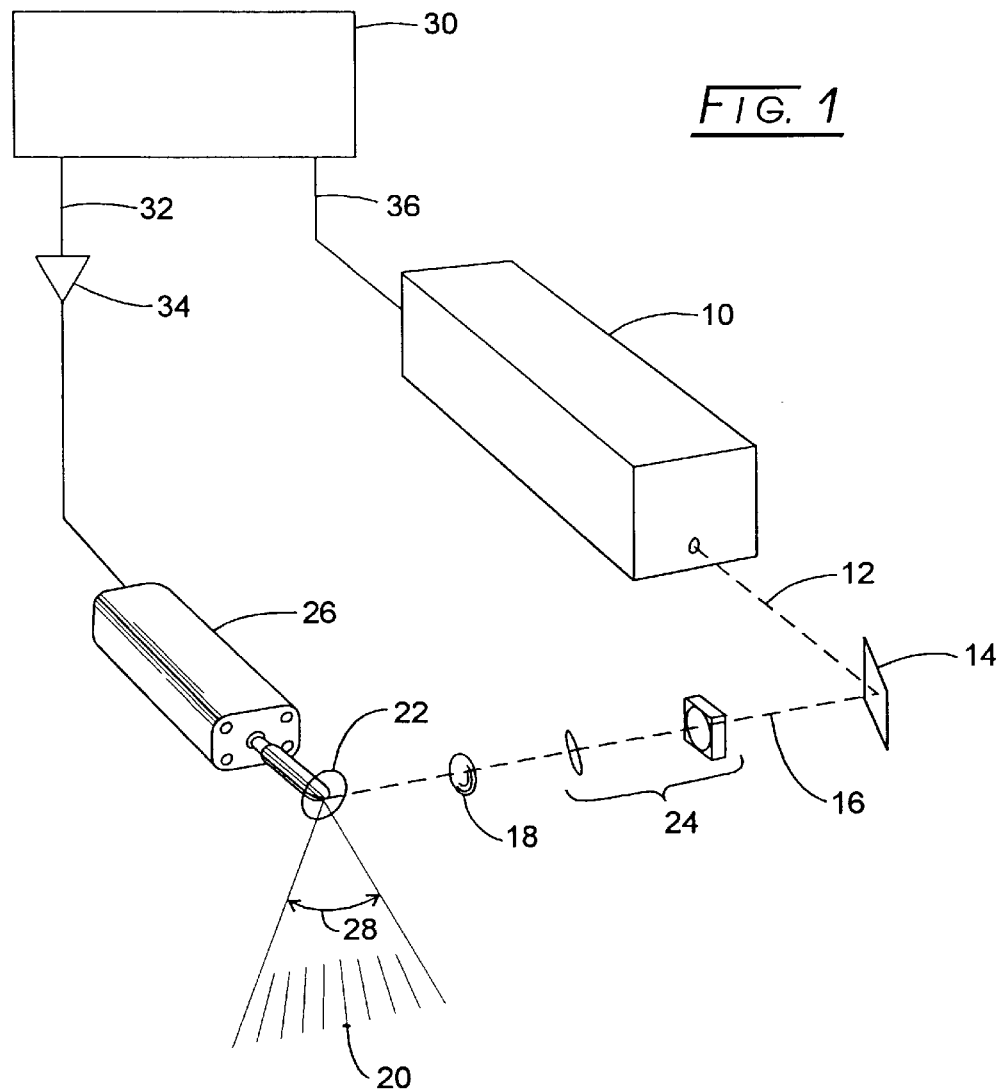
FIG. 1 is a schematic drawing of the inventive laser marking system showing its basic components.

Referring initially to FIG. 1 which depicts the basic components of the inventive laser marking system, sealed $CO_2$ laser 10 (e.g., a 50 watt, 10.6µinfrared unit, Synrad Inc., Bothell, Wash.) produces beam 12. Mirror 14 optionally is used to fold the beam and, thereby, reduce the size of the instant marking system. Reflected beam 16 is focused by lens 18 so that a spot is optimally focused at location 20 either on a product or on a tag surface, after the beam is deflected by Y-scanning galvanometer mirror 22. Optional beam expander assembly 24 will reduce the focusing spot size and produce higher power density blackening. Both lenses in optional beam expander assembly 24 and focusing lens 22 must be fabricated from infrared transmissive material, such as, for example, ZnSe.

Deflection of beam 16 is controlled by galvanometer 26. Deflection arc 28 and the on/off control of laser 10 is sequenced by control electronics 30 which provides analog signal 32 which is amplified by amplifier 34 (with optional servo feedback) to control galvanometer 26 and digital signal 36 which enables laser 10 lasing as is required by the image to be marked.

Figure 3:
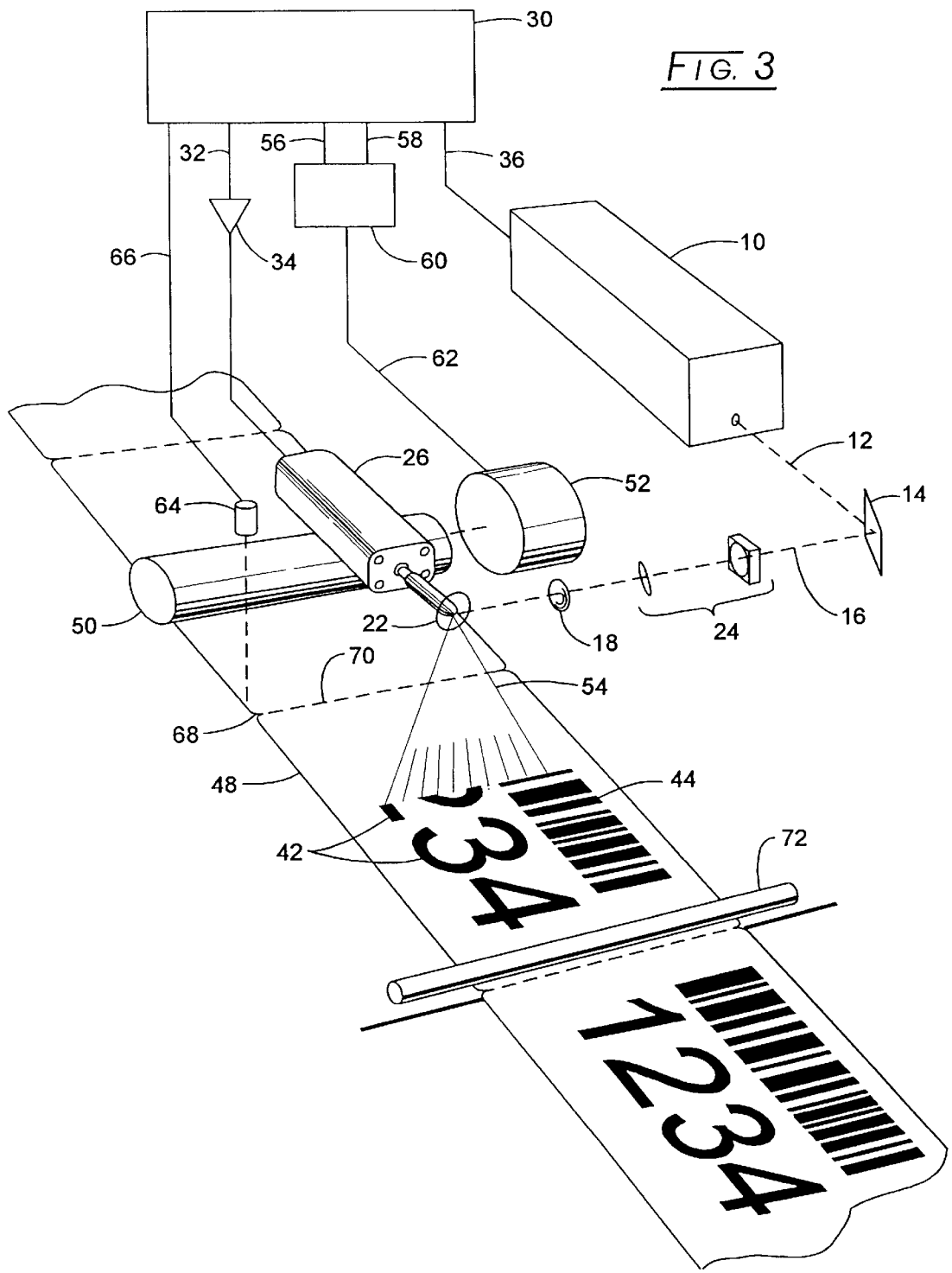
FIG. 3 is a schematic drawing of the inventive laser marking system with the marking engine stationary and the media (tag) to be printed moving.

FIG. 3 shows the laser marking engine stationary while the media (coated tag or product) moves relative thereto. That is, specially coated strip 48, preferably manufactured from stainless steel, is incrementally advanced by pinch roller 50 which is driven by stepper motor 52. This stepping action advances strip 48 a distance per step of, for example, 0.012 in (0.003 mm). Marking (e.g., of a nominal 0.012 in wide line) is done while the galvanometer deflected beam traverses in the Y direction over the unmarked zone while strip 48 is advanced under the fixed beam scan line (where beam 54 intersects strip 48 to create characters 42 and bar code 44. Drive electronics 30 provide digital outputs 56 (step) and 58 (direction) signals which are connected to stepper driver 60 which then produces multiphase outputs 62 appropriate for stepper motor 52.

Optical sensor 64 via line 66 is used to detect notch 68 in strip 48 to permit electronics 30 to determine the "top" or beginning of each individual tag for proper marking placement. Additionally, strip 48 may be nicked for break-off, as at line 70, for example. Control electronics 30 can advance each marked tag in strip 48 such that each nick, such as nick 68, is positioned at break-off bar 72 which permits the tags to be separated (hinged off), as at line 70, for use. Alternatively, strip 48 could be wound about a mandrel (not shown), or otherwise stored for immediate or later use.

Figure 4:
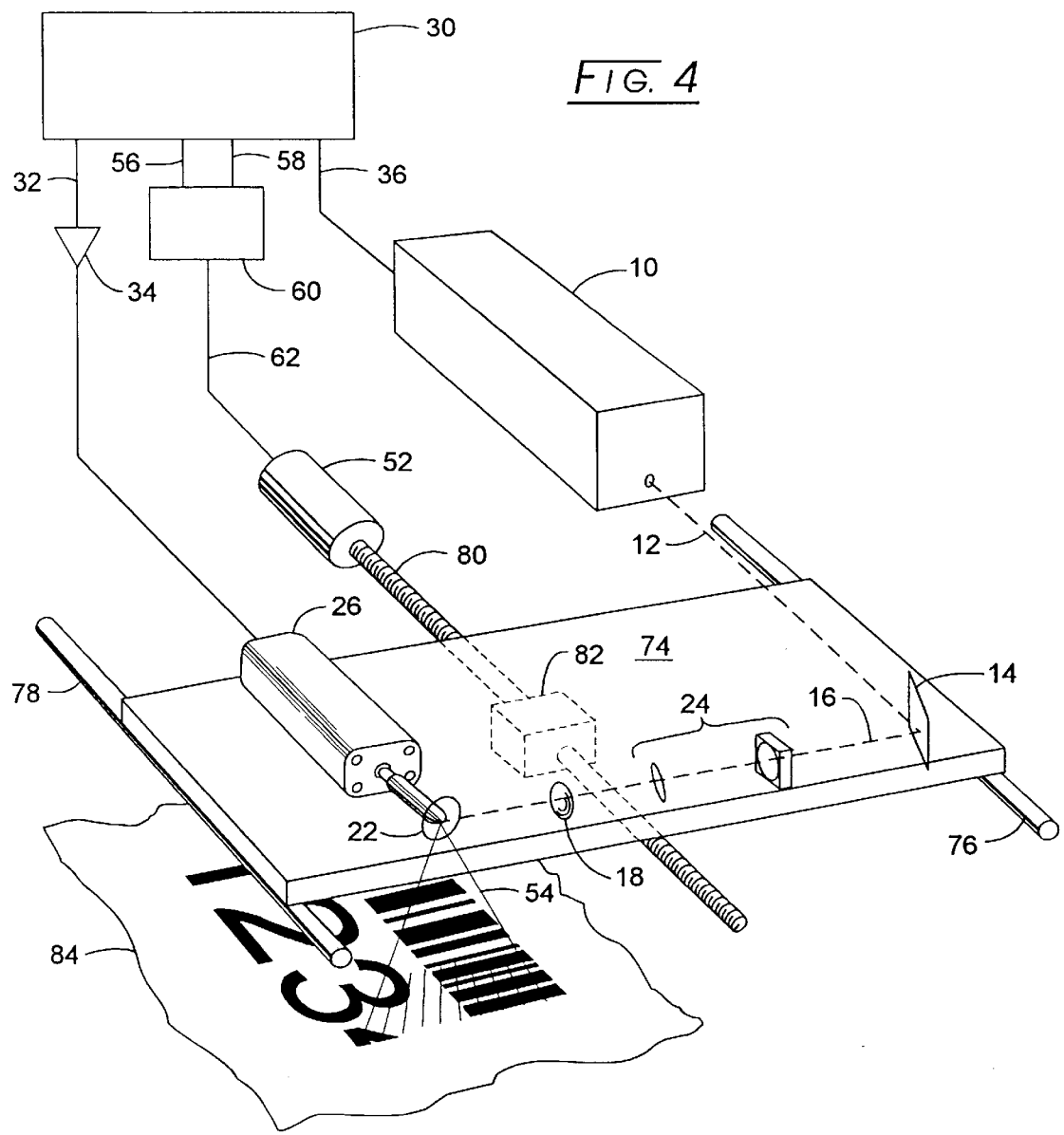
FIG. 4 is a schematic drawing of the inventive laser marking system with the marking engine optics movable and the media (tag) to be printed stationary.

FIG. 4 shows another configuration where an optics platform moves relative to a product to be marked which product remains stationary. Optics platform 74 consists of corner mirror 14, optional beam expander assembly 24, focusing lens 18, Y-axis deflecting mirror 22, and galvanometer 26. Optics platform 74 rides on rails 76, 78 and is moved in the X direction by stepper motor 52 which is connected to ball screw 80 which passes through ball nut 82. Ball nut 82 is connected to the under side of optics platform 74. In this configuration, the stepping action of stepper motor 52 advances optics platform 74 a distance per step of, for example, 0.012 in. The energy source, laser 10, can itself remain stationary and spaced-apart from optics platform 74 since beam 12 passes the marking energy to moving optics platform 74 via mirror 14. Marking is done while galvanometer-deflected beam 54 traverses over the unmarked zone on product or media 84 that has been coated with a coating containing an additive darkenable under the influence of the $CO_2$ infrared laser beam. Of course, other platform designs can be envisioned in accordance with the precepts of the present invention.

Laser 10 preferably is a $CO_2$ laser because sealed units with long (>10,000 operating hours) lives are available commercially. Other lasers, such as a YAG laser, can darken a wider variety of materials, but have a much shorter life and are, therefore, not suitable for many industrial environments.

Laser beam 54 is scanned in one direction only (Y-axis or Y direction) while the relative motion of the surface to be marked and/or the laser optics provides X-axis or X direction effective movement of the surface to be marked. Scanning in one direction only greatly reduces the cost of the galvanometer system compared to an X/Y two galvanometer plus flat field lens system which can position a focused beam over a relatively large area. Raster scanning, although slower for typical patterns, also permits the marking of long objects (such as, for example, large bar code tags) without error prone jogging and splicing with the marked image (bar code); although, the speed of the X direction (stepping) can be accelerated over blank areas (areas not to be marked) which does increase the overall speed of the marking cycle. The scanning angle, Y scanning, also can be varied as is appropriate for the marked height which also increases the overall speed of the laser scan.

Figure 2:
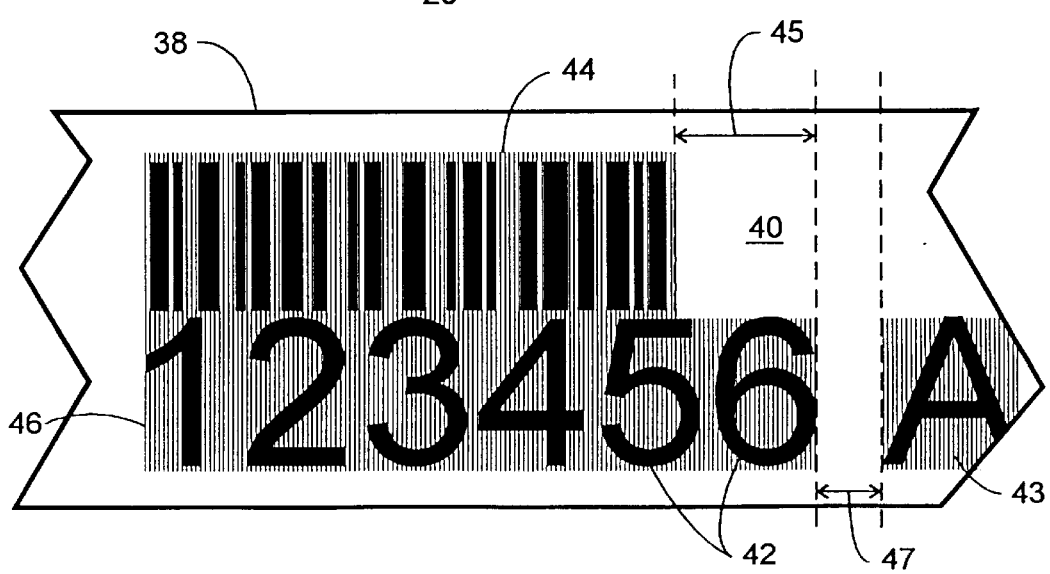
FIG. 2 is a plan view of a label that has been laser marked with both human readable characters and an optically scanable picket fence printed bar code.

Referring to FIG. 2, product or tag 38, having coated surface 40, has been laser marked with human readable alphanumeric characters, as at 42 and 43, and optically scanable picket fence printed bar code 44. The laser beam is raster scanned in the Y-axis by galvanometer mirror 22, as represented by the parallel series of thin lines, as at 46. Either tag 38 coated surface 40 is moved relative to mirror 22 or the optics platform of the laser marking engine is moved relative to surface 40, or both, in order to effectively move the beam in the X-axis to, thus, create characters 42/43 and bar code 44. Note, that angle of deflection 28 can be reduced when bar code 44 has been completed and only alphanumeric characters 42 need to be generated by omitting the area denoted by reference numeral 45. Additionally, the speed of the X (stepping motor) can be accelerated over the blank area (denoted by reference numeral 47) between numeral "6" and alphabet character "A" at reference numeral 43.

The inventive marking scheme requires a coating (e.g., coating 40) which is darkenable (e.g., blackened) by the focused $CO_2$ energy. Because many of the applications of this technology will involve the imaging of bar codes (red light absorptive or "black" bars on a white background), coating 40 should be highly reflective to the red light commonly used to scan such bar codes. White or red coatings, then, are preferred. For human readable characters, white backgrounds are preferred.

The coatings of choice are silicone resin coatings, such as described in "Silicone Resin Emulsions for High-Temperature Coatings", *Modern Paint and Coatings,* September 1993, Argus, Inc., Atlanta, Ga. (1993). Silicone resin binders typically are heat cured in the presence of catalysts with typical catalysts being selected from acids, bases, and the salts of metals, for example, zinc, tin, lead, or chromium octoates. Silicone resins can be blended or chemically combined with other film-forming polymers provided that the ultimate cured phenyl-substituted silicone binder is stable at the hot metal temperatures of use of the inventive labels. Phenyl-substituted resins are well known in the art, such as represented by D. H. Solomon, *The Chemistry of Organic Film Formers,* Second Edition, Robert E. Krieger Publishing, Inc., pp 334 et seq. (1977). The disclosures of the cited references are expressly incorporated herein by reference. Such coatings are pigmented conventionally with opacifying pigment ($TiO_2$ or $Al_2O_3$, for example) and are cured at elevated temperature (e.g., 800° F. for 5 minutes) in such a manner (e.g., by undercuring the coating) that residual methyl and/or phenyl groups remain unbound or free. When impinged upon by the focused $CO_2$ energy, the residual free methyl and/or phenyl groups are converted to either free carbon (black) or to SiC (also black). In high temperature tag use (e.g., 1750° F. stock), the free carbon is protected from oxidation loss (into $CO_2$, for example) by its residence in a dense (translucent) siloxane matrix. The SiC is inherently more resistant to oxidation at high temperatures. To permit a "deeper" blackening, it is desirable to use a lower pigment loading than would be typical in conventional coatings formulations (the pigments are opaque to IR radiation and are not darkened by incident IR energy alone).

Use of higher loadings of methyl silicones in the coating have been determined to provide better high temperature mark survival. Additionally, $TiO_2$ coated mica (so-called "perlescent") materials also aid in high temperature mark survival.

If a tag is coated and marked in accordance with the precepts of the present invention, the tag may be affixed to the product by a wide variety of conventional and unconventional manners. The tag may be affixed in the welding technique disclosed in commonly-assigned U.S. Pat. No. 5,422,167 (incorporated herein by reference) or by the welding technique in commonly-assigned application Ser. No. 08/661,064, filed on even date herewith (attorney docket INF 2-016 (incorporated herein by reference) now Pat. No. 5,714,234. In this regard, only one edge of the laser marked tag may be welded to the product leaving the opposite end free. This configuration may permit the tag to be lifted and cracked off adjacent the weld attachment. In fact, the laser marked tag even may be scored to facilitate this crack off procedure of removing the tag once its function of product identification has been satisfied.

I claim:

1. Method for marking product for its identification, which comprises:

(a) forming on said product or on a tag to be attached to said product a zone coated with a layer of coating containing silicone resin having pendant groups selected from one or more of methyl groups and phenyl groups and which contains $TiO_2$ coated mica, said layer having been cured to a degree effective for marking by blackening of said layer by a $CO_2$ laser beam by blackening by the combined use of said silicone resin and said $TiO_2$ coated mica; and (b) directing said $CO_2$ laser beam onto said zone to cause said blackening and forming identification indicia selected from one or more of alphanumeric characters and graphics.

2. The method of claim 1, wherein said zone moves in an X-axis during said directing.

3. The method of claim 1, wherein said laser beam is impinged onto said zone in one direction only.

4. The method of claim 2, wherein movement in the X axis is accelerated over areas not to be marked by said laser beam.

5. The method of claim 1, wherein said tag is attached to said product along one edge to facilitate said tag being cracked off for removal.

6. The method of claim 1, wherein the zone is formed on said tag.

7. The method of claim 1 wherein the zone is formed on said product.

8. The method of claim 1, wherein the laser beam from a $CO_2$ laser impinges upon a moving mirror attached to a galvanometer, the movement of said mirror effecting scanning of said laser beam in a Y-axis.

9. The method of claim 8, wherein said zone and said laser remain stationary and said mirror moves in an X-axis.

10. The method of claim 1, wherein the angle scanned by the laser beam scans an angle which is varied to match the indicia formed.

11. The method of claim 1, which includes, if said zone was applied to a tag, attaching said tag to said product.

* * * * *